Nov. 9, 1926.
E. W. JOHNSON
1,606,077
TRACTOR WHEEL
Filed May 22, 1926      2 Sheets-Sheet 1
Fig.1.
Fig.2.
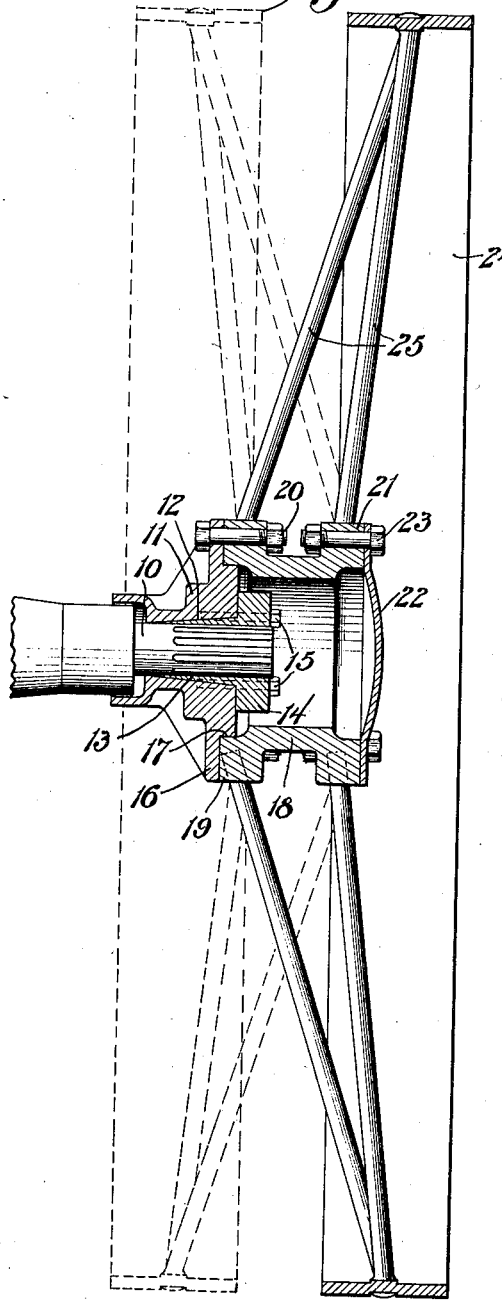
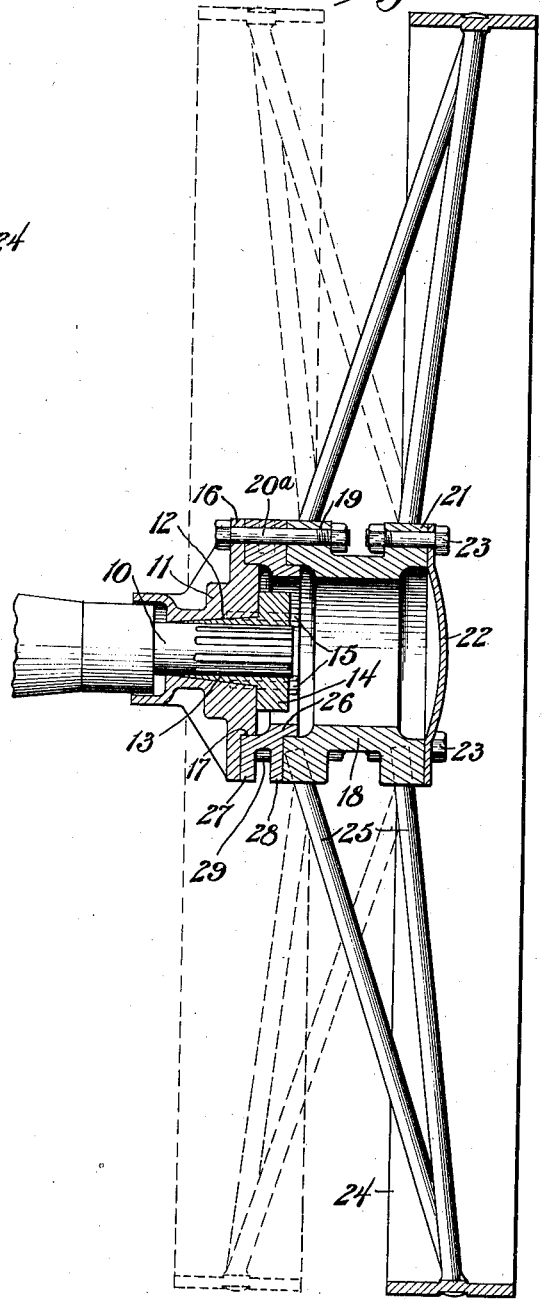
WITNESSES
C. L. McDonald.
E. N. Lovewell
INVENTOR
F. W. Johnson
BY
ATTORNEY Nov. 9, 1926.
1,606,077
E. W. JOHNSON
TRACTOR WHEEL
Filed May 22, 1926   2 Sheets-Sheet 2
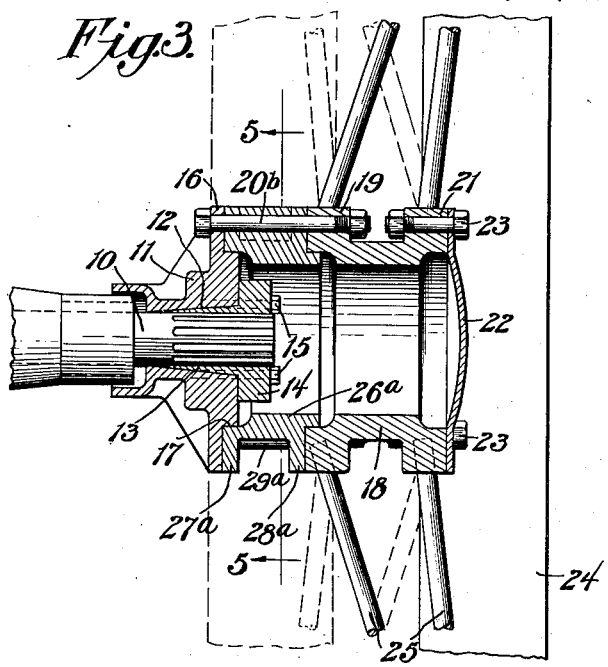
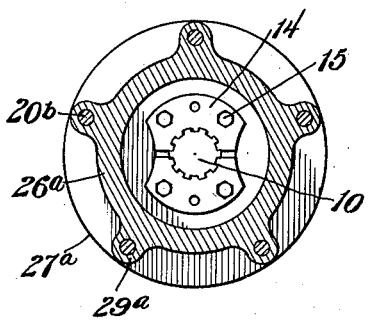
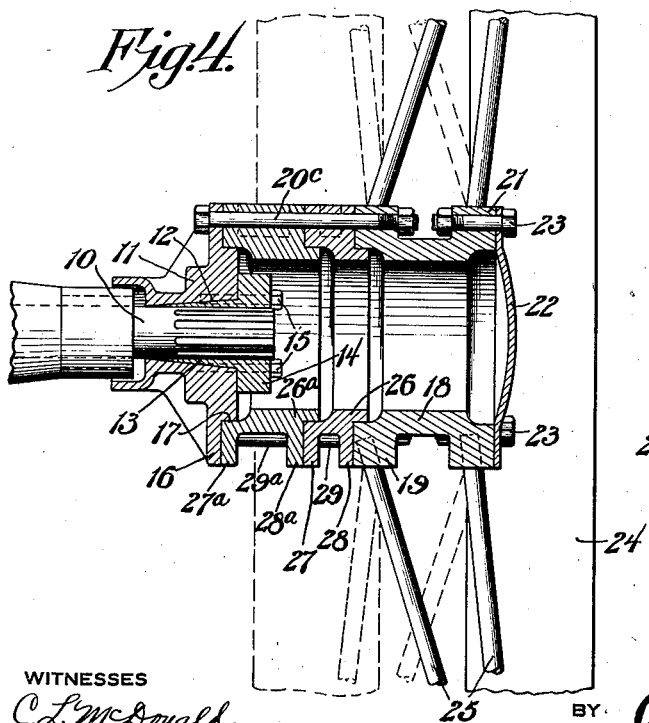
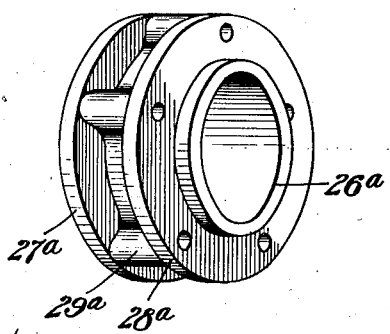
WITNESSES
C. L. McDonald.
E. N. Lovewell.
E. W. Johnson
INVENTOR
BY
ATTORNEY Patented Nov. 9, 1926.

1,606,077

UNITED STATES PATENT OFFICE.

ELMO WILLIAM JOHNSON, OF HICKSVILLE, NEW YORK.

TRACTOR WHEEL.

Application filed May 22, 1926. Serial No. 110,992.

This invention relates primarily to tractor wheels, and particularly to the manner of connecting the same to the axle, the object being to provide a convenient and practical construction, whereby the wheels may be set at any desired distance apart. This is especially desirable on farm tractors, since it permits the wheels to be set so that they may be driven between plant rows located at any given distance apart, or so that the tractor may be adapted for other kinds of farm or industrial work.

The specific construction of the invention and the advantages resulting therefrom will be more particularly explained in connection with the accompanying drawings, which illustrate the invention in its preferred form.

In the drawings:

Figure 1 is a diametric section through a wheel constructed according to the invention, the wheel being shown in full lines in its outer position, with dotted lines showing the position of the wheel when reversed.

Figure 2 is a similar view showing the use of a spacer ring.

Figure 3 is a similar view showing the use of a larger spacer ring.

Figure 4 is a similar view showing the use of both spacer rings together.

Figure 5 is a section taken on the line 5—5 of Figure 3.

Figure 6 is a perspective view of one of the spacer rings.

The invention is shown in connection with a tractor axle 10, which is shown in the drawings as fluted, but the invention is equally well adapted to be used with a straight axle having an ordinary key seat. A hub extension 11 is formed with a tapered bore 12, adapted to receive a tapered split sleeve formed by two complementary wedge members 13, which are provided with flanges 14 for receiving bolts 15, which secure the wedge members to the hub extension, and wedge the latter to the axle.

The hub extension 11 is formed with a peripheral flange 16 and an annular shoulder 17, thus providing a seat for the end of a wheel hub 18. The wheel hub is symmetrical in shape, being formed at one end with a flange 19, adapted to be secured by bolts 20 to the flange 16 of the hub extension, and a similar flange 21 at the other end forms a seat for a hub cap 22, which is secured by bolts 23. The rim 24 of the tractor wheel is secured to the hub 18 by spokes 25, which are inclined, so that the plane of the wheel is offset from the center of the hub. In the position shown in full lines in Figure 1, the wheel rim is to the outside of the hub. Its position, however, may be reversed, as indicated by dotted lines, by connecting the flange 21 to the flange 16 of the hub extension, and attaching the hub cap 22 to the flange 19.

As shown in Figure 2, the wheel may be set farther from the center of the tractor by the use of a spacer ring 26, interposed between the hub 18 and the hub extension 11. This spacer ring is formed with a flange 27, adapted to seat against the flange 16 and shoulder 17, and is formed with a flange 28, against which the hub 18 is adapted to seat. The hub 18, spacer ring 26 and hub extension 11 are secured in assembled relation by bolts 20$^a$, which are longer than the bolts 20, the spacer ring being formed with ribs 29 between the flanges 27 and 28 for receiving the bolts.

The spacer ring 26 will usually be made so as to offset the wheel two inches, and if a greater offset is desired, a four inch spacer ring 26$^a$ may be used, as shown in Figure 3. This spacer ring is formed in the same manner as the ring 26 with flanges 27$^a$ and 28$^a$, connected by ribs 29$^a$ for receiving bolts 20$^b$, which hold the parts in assembled relation.

If a still greater offset is desired, both of the rings 26 and 26$^a$ may be used, as shown in Figure 4, the parts being secured in assembled relation by bolts 20$^c$.

According to the arrangement above described, by using the assembly with or without the spacer rings, and by setting the wheel in the position shown in full lines, or in a reverse position, the distance between the wheels may be varied through a wide range. By using spacer blocks of two or four inches respectively, in connection with the reversible wheel, an adjustment range as great as three feet may be obtained.

While I have described the invention as being designed primarily for use in connection with tractor wheels, it is obvious that it may be used in the same manner in connection with other wheels, wherever it is desired to adjust the same to different distances. It is also apparent that various modifications may be made in the detailed construction and arrangement of the various elements without any material departure from the salient features as claimed.

What is claimed is:

1. In a vehicle wheel, a hub extension, means for securing the same to an axle, a ring adapted to seat on said extension, a wheel having a hub adapted to seat on said ring, and means for securing the wheel hub, ring and hub extension in assembled relation.

2. In a vehicle wheel, a hub extension, means for securing the same to an axle, said extension having a peripheral flange with an annular shoulder at the base thereof, a ring having on one side an annular portion adapted to seat against said flange and shoulder and having on the other side a flange and shoulder similar to those on the hub extension, a wheel having a hub with a portion adapted to seat on the flange and shoulder of the ring, and means for securing the wheel hub, ring and hub extension in assembled relation.

3. In a vehicle wheel, a hub extension, means for securing the same to an axle, said extension being formed with a seat, a plurality of rings fitting together in coaxial relation with the innermost ring fitting said seat, a wheel having a hub seating against the outermost ring, and means for securing the wheel hub, rings and hub extension in assembled relation.

4. In a vehicle wheel, a hub extension, means for securing the same to an axle, said extension having a peripheral flange with an annular shoulder at the base thereof, a plurality of rings, each having a flange and shoulder on its outer side similar to those on the hub extension and having on its inner side a complementary mating portion so that the rings and hub extension may seat one on the other in coaxial relation, a wheel having a hub with a similarly mating portion, and means for securing the wheel hub, rings and hub extension in assembled relation.

5. In a vehicle wheel, a hub extension, means for securing the same to an axle, a ring adapted to seat on said extension, a wheel having a hub with a rim secured in offset relation to the hub, said hub having like ends, either of which is adapted to seat on said ring, and means for securing the wheel hub, ring and hub extension in assembled relation.

6. In a vehicle wheel, a hub extension, means for securing the same to an axle, said extension being formed with a seat, a plurality of rings fitting together in coaxial relation with the innermost ring fitting said seat, a wheel having a hub with a rim secured in offset relation to the hub, said hub having like ends, either of which is so shaped as to seat against the outermost ring, and means for securing the wheel hub, rings and hub extension in assembled relation.

In testimony, that I claim the foregoing as my own I have hereto affixed my signature.

ELMO WILLIAM JOHNSON.